United States Patent [19]

Furukawa et al.

[11] Patent Number: 4,674,345
[45] Date of Patent: Jun. 23, 1987

[54] AUTOMATIC TRANSMISSION HAVING HYDRAULIC AND ELECTRONIC CONTROL SYSTEMS

[75] Inventors: Tamotsu Furukawa, Yokohama; Masanori Mori, Aichi, both of Japan

[73] Assignee: Aisin Seiki Kabushiki Kaisha, Aichi, Japan

[21] Appl. No.: 678,778

[22] Filed: Dec. 6, 1984

[30] Foreign Application Priority Data

Feb. 14, 1984 [JP] Japan ............................... 59-026700
Feb. 17, 1984 [JP] Japan ............................... 59-029257

[51] Int. Cl.⁴ .................... F16H 3/14; B60K 41/10; B60K 41/18
[52] U.S. Cl. .................................... 74/335; 192/092; 74/866
[58] Field of Search .............. 74/866, 335, 336 R, 74/473 R; 364/424.1; 192/0.092

[56] References Cited

U.S. PATENT DOCUMENTS

| | | | |
|---|---|---|---|
| 1,903,635 | 4/1933 | Saives | 192/0.092 X |
| 2,026,827 | 1/1936 | Dillon | 74/473 R |
| 3,530,668 | 9/1970 | Siebers et al. | 60/51 |
| 3,667,577 | 6/1972 | Weymann | 192/0.092 X |
| 3,876,033 | 4/1975 | Shore | 74/473 R |
| 3,944,013 | 3/1976 | La Pointe | 74/335 X |
| 3,945,265 | 3/1976 | Bell et al. | 74/335 |
| 4,194,608 | 3/1980 | Usui et al. | 192/0.092 |
| 4,445,393 | 5/1984 | Braun | 74/473 R X |
| 4,475,637 | 10/1984 | Oguma et al. | 192/0.092 X |
| 4,493,228 | 1/1985 | Vukovich et al. | 74/866 X |
| 4,531,433 | 7/1985 | Suga | 74/869 |
| 4,579,015 | 4/1986 | Fukui | 74/335 X |

FOREIGN PATENT DOCUMENTS 1605904 4/1971 Fed. Rep. of Germany.

Primary Examiner—Allan D. Herrmann
Assistant Examiner—Dirk Wright
Attorney, Agent, or Firm—Burns, Doane, Swecker & Mathis

[57] ABSTRACT

A transmission which is controlled by an electronic control unit for gear shift operation, said transmission comprising a shift actuator including a plurality of shift shafts for effecting engagement and disengagement of the transmission gears to accomplish a plurality of shift ranges and the same number of cylinders each being operatively connected with respective one of said shift shafts, said shift actuator being controlled by the signals from the electronic control unit for effecting the gear shift operation.

Each of said shift shafts is operatively connected with a respective piston disposed in each cylinder by means of a select lever assigned to the piston and the shift shaft. The shift shafts axially move to engage and disengage the transmission gears. The cylinders are disposed parallel or coaxial with the shift shafts.

19 Claims, 4 Drawing Figures

AUTOMATIC TRANSMISSION HAVING HYDRAULIC AND ELECTRONIC CONTROL SYSTEMS

FIELD OF THE INVENTION

The present invention relates to an automatic transmission which does not require any clutch pedal operation and particularly to improvements in an automatic transmission including an electronic control unit adapted to provide a signal for accomplishing gear shift operation, associated with clutch engagement or disengagement, optionally also with throttle opening. The automatic transmission of the present invention is applicable to large size tracks and buses as well as general automobiles.

BACKGROUND OF THE INVENTION

Prior art concerning with such an automatic transmission is disclosed in Japanese Patent Kokai-Publication No. 58-170955 which proposes a transmission of the type of parallel axis gear arrangement including an electronic control unit into which signals representative of engine revolution speed, brake operation, accelerator pedal position, gear shift lever position, clutch release position and vehicle speed are input, said electronic control unit being adapted to provide output signals for accomplishing throttle opening control, clutch engagement or disengagement and gear shift operation. The transmission furthermore includes a shift and select actuator having three shift shafts for actuating a synchronization mechanism of the transmission gears and a select lever (internal lever) which selectively engages with one of the shift shafts. The shift select actuator is controlled in response to the output signals of the electronic control unit for gear shift operation. Upon setting the position of the shift lever, the electronic control unit automatically operates the clutch engagement or disengagement and gear shift operation in response to the signals representative of engine revolution speed, accelerator pedal position and vehicle speed, wherein the troublesome operation of the clutch pedal is eliminated. Japanese Patent Kokai-Publication No. 58-170954 discloses also a transmission of the same type as JP-Patent Kokai No. 58-170955.

SUMMARY OF THE DISCLOSURE

The conventional transmissions have, however, following drawbacks. Two-step operation must be performed in the shift and select actuator for actuating the synchronization mechanism of the transmission gear. That is, the select lever is moved in a select direction to engage with (or select) one of the shift shafts and the selected shift shaft is moved in a shift direction which extends perpendicularly to the select direction. It is therefore difficult to carry out a quick gear shift operation, resulting in a slow response of wheels to engine drive power and difficulties in quick acceleration and deceleration.

It is therefore an object of the present invention to provide a novel automatic transmission.

It is another object of the present invention to provide an automatic transmission which enables quick gear shift operation.

It is a further object of the present invention to provide an automatic transmission in which gear shift operation can be carried out by one motion in a shift direction of shift shafts.

It is a furthermore object of the present invention to provide an automatic transmission which provides a quick response of wheels to engine driving power enabling quick acceleration and deceleration.

According to the present invention, the drawbacks in the prior art hereinabove mentioned are analyzed that these are based on the structure of the shift and select actuator, wherein one shift and select actuator is operatively connected with one select lever which in turn selectively engages one of the shift shafts.

In one aspect of the present invention there is provided an automatic transmission having an electronic control unit for gear shift operation, said transmission comprising a shift actuator including a plurality of shift shafts for effecting engagement and disengagement of transmission gears to accomplish a plurality of shift ranges, and the same number of cylinders each of which is operatively connected with any of said shift shafts, said shift actuator being controlled by the signals from the electronic control unit for effecting the gear shift operation.

The present invention comprises the first aspect primarily relating to the actuator structure and a second aspect primarily relating to the control unit.

Preferred embodiments of the first aspect of the present invention comprises following features.

Each cylinder includes a piston which axially moves within the cylinder and is operatively connected with one of the shift shafts. The piston is biased by a spring to a neutral position and divides a space within the cylinder into first and second cylinder chambers.

The piston takes a first or second position when working pressure is applied to the first or second cylinder chamber, respectively, and takes the neutral position which is between the first and second positions when no working pressure is applied to any of the cylinder chambers.

N range is accomplished when no working pressure is applied to any of cylinder chambers of any cylinders, and each range except the N range is accomplished when working pressure is selectively applied to any one of the cylinder chambers of the cylinders.

Switches for detecting the first and second positions (thus also the neutral position) are preferably provided operatively associated with the pistons.

According to the first aspect of the present invention, the shift operation can be effected in the actuator by only one motion (actuation or deenergication) of any of the cylinders associated with any of the shift shafts, respectively, resulting in a quick shift operation to enable quick acceleration and deceleration. Namely, accomplishment of any desired shift range is defined by whether any of the cylinders is actuated or not.

In contrast to the present invention, the conventional transmission of the type as hereinabove mentioned needs a multi-directional operation of the shift lever in order to accomplish a shift operation, usually in at least two different directions (axially of the shift shaft and perpendicular thereto), which fact raises a serious problem in attempting to further improve the driverbility and fuel economy.

In a second aspect of the present invention there is provided an automatic transmission including:
an electronic control unit for gear shift operation;
a shift actuator including a plurality of shift shafts each for effecting engagement and disengagement of transmission gears to accomplish one of shifts ranges, respectively, and the same number of cylinders each operatively connected with each of said shift shafts, respectively, and a hydraulic control unit for controlling said shift actuator including a plurality of solenoids which are responsive to the output signals from the electronic control unit wherein gear shift between adjacent shift ranges is effected by actuating one of the solenoid valves.

Preferred embodiments of the second aspect comprises following features.

The transmission comprises a hydraulic gear shift control unit operating responsive to the output of the electronic control unit and comprising solenoid valves. In the hydraulic gear shift control unit, a plurality of valve means is responsive to the output signals from the solenoid valves.

Each of the valve means preferably comprises a spool valve having a spool which moves between different two positions in response to the output signals from the solenoid valves. The spool valve means form a hydraulic fluid circuit with a plurality of lines connected among said spool valves, said circuit having exits at which working pressures are generated for accomplishing respective shift ranges. The exits of the circuit are connected with the cylinders of the shift actuator.

In one embodiment, the solenoid valves are comprised of first, second and third solenoid valves. Only the first solenoid valve is actuated to accomplish the 1st speed range. The second solenoid valve is further actuated to accomplish the 2nd speed range while the 1st solenoid valve remains actuated. Only the 1st solenoid valve is further deenergized to accomplish the 3rd speed range while the 2nd solenoid valve remains actuated. The 3rd solenoid valves is further actuated to accomplish the 4th speed range while the 2nd solenoid valve remains actuated.

When the shift operation is to be carried out in response to the vehicle conditions, such as engine revolution speed, accelerator pedal position, shift lever position and vehicle speed, the electronic control unit shunts over one of solenoid valves between actuated and deenergized positions and in turn one of the cylinders for moving one of the shift shaft in a shift direction. Thus one shift operation can be carried out by one motion, enabling quick shifting, acceleration and deceleration.

In a preferred embodiment of the electronic control unit, it provides a signal for controlling clutch engagement and disengagement associated with the signal for controlling the gear shift operation. The electronic control unit preferably provides the output signals including a further signal for controlling throttle valve opening based on input signals representative of engine revolution speed (r.p.m.), brake operation, accelerator pedal position, shift lever position, clutch release position and vehicle speed. The clutch engagement can be controlled to establish ON, OFF and any stepped or continuously changeable intermediate states.

The same will also apply with respect to the electronic control unit for the first aspect of the present invention.

In both aspects, the gear shift operation is carried out associated with clutch operation which is automatically controlled by the electronic control unit.

It is advantageous in the present invention that a conventional manual transmission with a clutch may be utilized and changed into an automatic transmission by a slight structural modification for the gear shift actuating arrangement. Each of the shift shafts may effect shifting via a synchronization mechanism of the transmission gear as is the case in the conventional transmissions. Also following advantages account for the improvement of the present invention.

A fuel consumption as high as that of the manually gear-shifted transmission can be expected since torque transmission is effected as is the case of the conventional manually gear-shifted transmission without using any torque convertor.

Also a fuel consumption better than that of the manually gear-shifted transmission which greatly depends upon the driver's skill can be expected since the clutch engagement or disengagement operation is carried out in accordance with a preset pattern by means of the electric control unit.

The present invention will be elucidated based on the preferred embodiments with reference to the accompanying Drawings, which, however, serve to illustrate the invention and modification within the essential concept of the present invention may be allowed.

DESCRIPTION OF THE PREFERRED EMBODIMENTS

Figure 1:
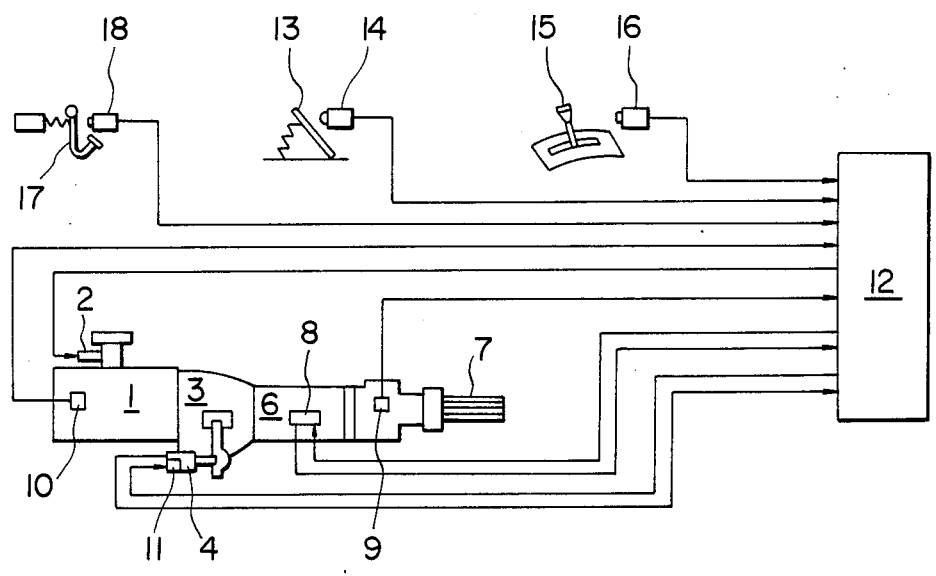
FIG. 1 is a schematic view showing a system of the present invention.

Referring now to FIG. 1 there is shown an engine 1 which is coupled with a propeller shaft 7 via a clutch 3 and a transmission 6. The amount of fuel to be injected into the engine 1 is controlled by a throttle valve actuator 2. The clutch 3 is brought into engagement or disengagement by means of a clutch actuator 4. The shift range (or gear ratio) of the transmission 6 is controlled by a shift actuator 8 mounted thereon. A speed sensor 9 is disposed within the transmission 6. A rotational number (revolution speed) sensor 10 is secured to the engine 1. A sensor 11 which detects the displacement of the clutch actuator is mounted on the clutch 3.

An electronic control unit 12 is electrically connected with a sensor 14 for detecting the accelerator pedal position which is provided at an accelerator pedal 13, a shift lever position sensor 16 provided at a shift lever 15 which is manually operated by a driver, the engine rotational number sensor 10, a vehicle speed sensor 9, and a brake sensor 18 provided at a brake pedal. The electronic control device 12 receives the output signals from the above-mentioned sensors and outputs signals to the above-mentioned actuators for actuation thereof to provide a suitable vehicle running conditions.

Figure 2:
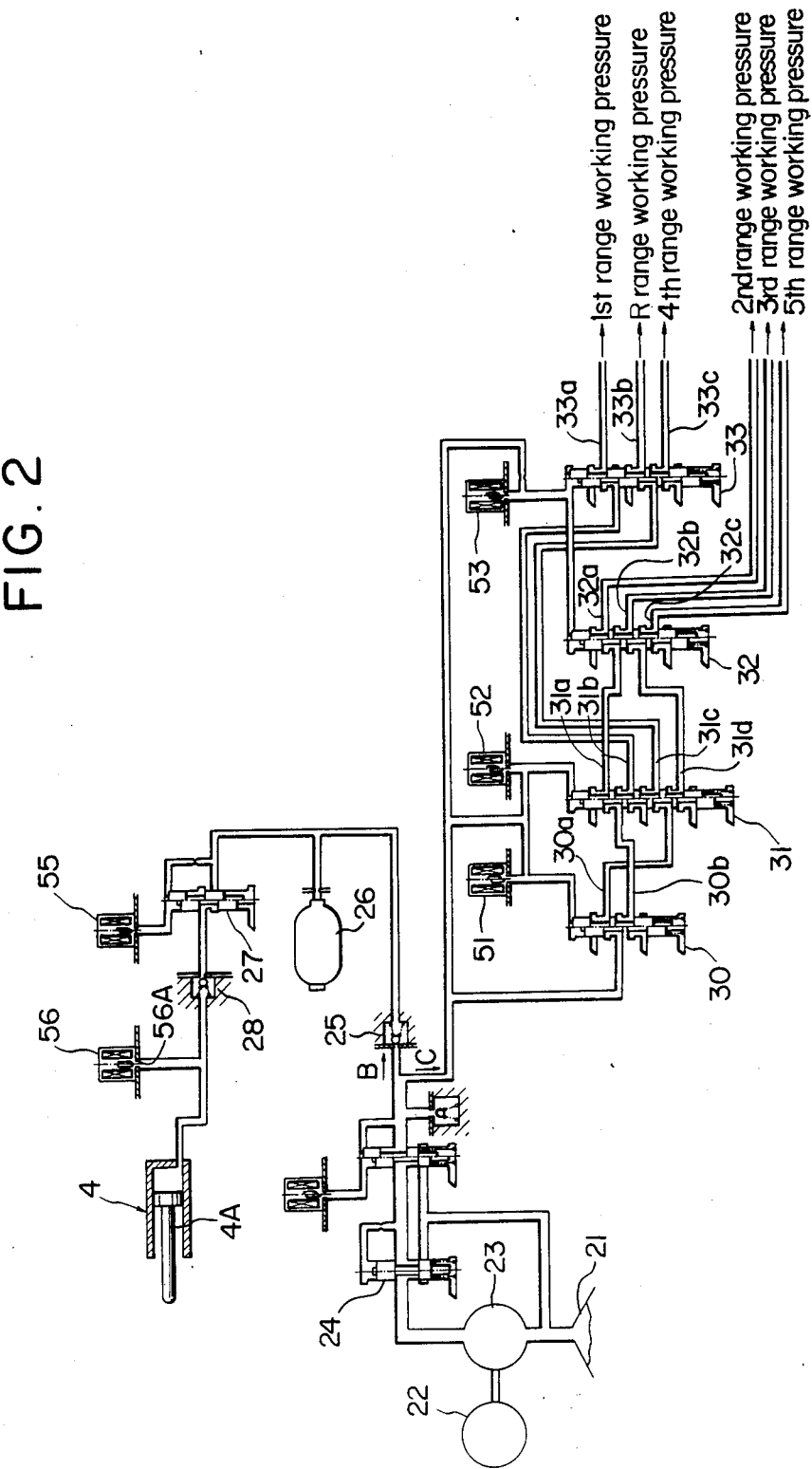
FIG. 2 is a diagram showing a hydraulic gear shift control unit of the present invention.
Figure 3:
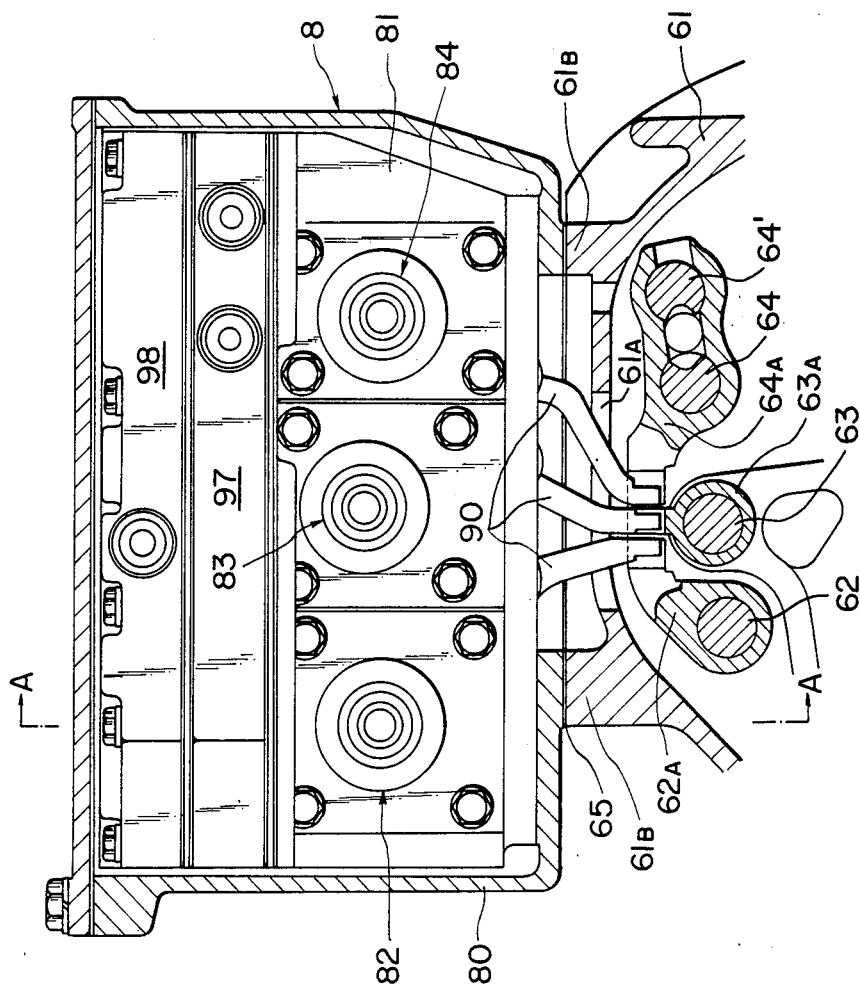
FIG. 3 is a view showing the mounting of an shift actuator of the present invention on the transmission.
Figure 4:
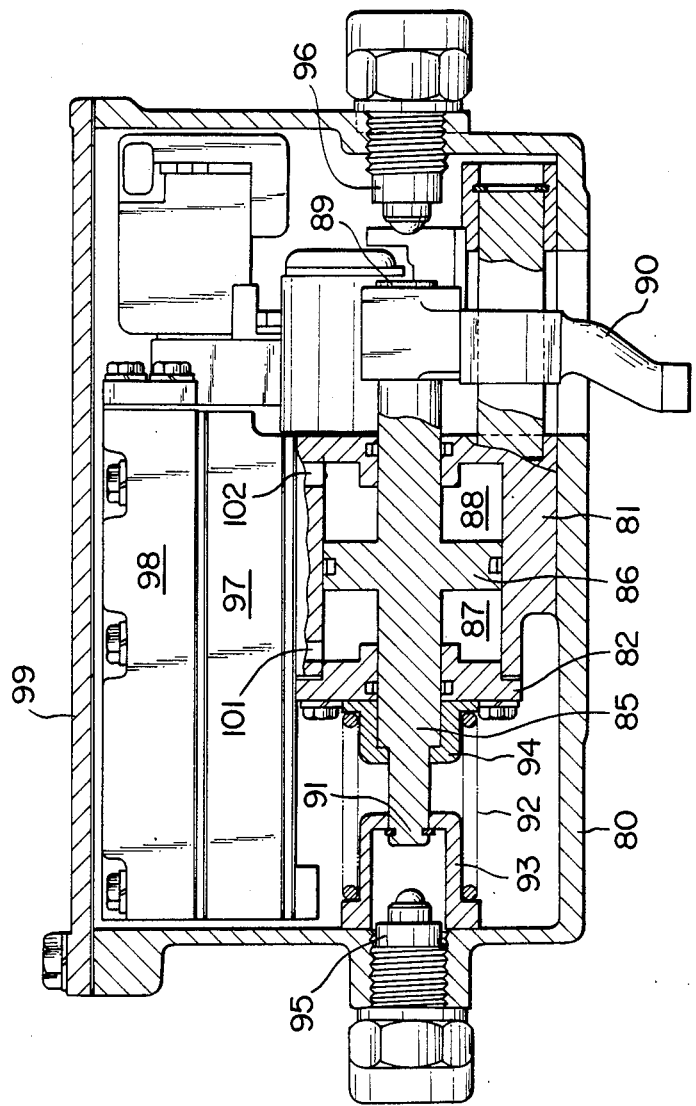
FIG. 4 is a sectional view through the shift actuator.

The structure of the shift actuator 8 is shown in FIGS. 3 and 4. The transmission 6 is housed in a casing 61. Shift shafts 62, 63 and 64 each of which links one of shift heads 62A, 63A and 64A with a fork for actuating a synchronization mechanism of a transmission gear, respectively, are disposed so that they can be moved in a direction normal to the Figure surface as is similar to the conventional manual transmission. The shift shafts 62, 63 and 64 enable the gear shifts between the shift ranges of 1st and 2nd, 3rd and 4th and 5th and R, respectively. The casing 61 is provided with an opening 61A. A seat 61B for mounting the shift actuator 8 is provided at the periphery of the opening 61A. The actuator 8 including a housing 80 and a body 81 is mounted on the seat 61 via a seal member 65. Three cylinders 82, 83 and 84 which correspond to the shift shafts 62, 63 and 64, respectively, are disposed in the body 81. FIG. 4 shows the section of the cylinder 82 along a line A—A of FIG. 3. The cylinder 83 and 84 are identical with the cylinder 82 in structure. Within each cylinder is disposed a piston 85 with a land 86 to divide a space in the cylinder 82 into two spaces to form cylinder chambers 87 and 88. A select lever 90 is secured to one rod end 89 of the piston 85. Each select lever 90 extends through the opening 61A of the casing 80 and has free end engaged with any of the shift heads 62A, 63A and 64A, respectively, as shown in FIG. 3. At the stepped portion of the other end 91 of the piston 85 is retained a compression spring 92 and a pair of of retainers 93 and 94. The biasing force of the spring 92 is supported by a cylinder cover 82 secured to a cylinder body 81 and the housing 80. Switches 95 and 96 opposing the ends 89 and 91 of the piston 95, respectively, are secured to the housing 80. Valve bodies 97 and 98 and solenoid valves which form a hydraulic circuit shown in FIG. 2 are mounted on the body 81. Hydraulic lines 101 and 102 which are communication with any of shift valves as shown in FIG. 2 are arranged to communicate with the cylinder chambers 87 and 88 respectively. A housing cover 99 and the housing 80 encase the cylinder body 81, valve bodies 97 and 98 and solenoid valves etc., and separate them from atmosphere.

FIG. 2 shows the relation between the clutch actuator 4 and the shift actuator 8 in the control hydraulic circuit. Pressurized oil which is supplied from a strainer 21 by an oil pump 23 driven by a battery powered motor 22 is kept at a given pressure by a first regulator valve 24. A part of the pressurized oil B is introduced into a line for the clutch actuator via a check valve 25 and stored in an accumulator 26. When a signal of clutch disengagement is generated by the electronic control unit 12, the solenoid valve 55 is energized to move a valve 27 downwards, whereby the pressurized oil is introduced into the inside of the clutch actuator 4 via a second check valve 28 to move a piston 4A leftwards as viewed in FIG. 2 to disengage the clutch. The displacement amount of the piston 4A is detected by the sensor 11, so that the electronic control unit determines when the necessary displacement for the clutch disengagement has been accomplished and outputs a signal for the solenoid valve 55, whereupon valve 27 closes the line between the accumulator 26 and the clutch actuator 4. When a signal representative of clutch engagement is generated to open the solenoid valve 56, the pressurized oil in the clutch actuator 4 is discharged to engage the clutch. The solenoid valve 56 is capable of duty control in which the return control of the clutch is slowly carried out. The discharge rate of the pressurized oil is determined by the electronic control unit 12 while being detected by the sensor 11 so that the clutch engagement state suitable for the accelerator pedal position, vehicle speed and shift lever position may be obtained. On the same token, any desired, intermediate engagement state of the clutch (i.e., position of the piston 4A ) can be accomplished by energizing the solenoid valve 56 under a predetermined or regulatable duty rate. This arrangement enables the half clutch state and such control based on the engine and vehicle conditions.

The other part of the pressurized oil C is introduced into the shift cylinders 82, 83 and 84 in the shift actuator 8 via shift solenoid valves 51, 52 and 53, shift valves 30, 31, 32 and 33 for accomplishing the shift operation.

In the neutral position N in which the shift lever is not shifted to any shift range the solenoid valves 51, 52 and 53 are not actuated and spools of the valves 30, 31, 32 and 33 are biased upwardly as viewed in FIG. 2. The pressurized oil C is not supplied to any of cylinders. At this time the piston 85 in the cylinder 82 is positioned as shown in FIG. 4.

When a shift from N to 1st shift range is instructed by the electronic control unit 12, a signal is input to the solenoid valve 53 to close the valve, whereupon the pressurized oil C urges the spools of the valves 32 and 33 to move downwards. Accordingly the pressurized oil C is introduced into the cylinder chamber 88 of the cylinder 82 as a 1st range working pressure to urge the piston 85 to move leftwards as viewed in FIG. 4. This movement causes the select lever 90 forcively secured on the piston, the shift head 62A and the shift shaft 62 to move resulting in shifting to 1st shift range. At this time the end of the piston 85 is brought into abutment with the switch 95 so that the completion of the shifting to the 1st shift range is informed to the electronic control unit 12 to begin engagement operation of the clutch afore-mentioned.

Table 1 shows the relation of the shift ranges with the position of solenoid valves and pressure application of the cylinders.

The shifting from the 1st to 2nd shift range will now be described. When the shifting from the 1st to 2nd shift range is instructed, after having completed the clutch disengagement operation the solenoid valve 52 closes while the solenoid valve 53 continues to close and the pressurized oil C urges the spool of the valve 31 to move downwards. As the result of this, the pressurized oil C entering the valve 30 is introduced into the cylinder chamber 87 of the cylinder 82 as a 2nd range working pressure via lines 30b, 31a and 32a. On the other hand, the pressurized oil which has been in the line 31b is drained by the afore-mentioned movement of the spool of the valve 31, and the pressure supply to the cylinder chamber 88 is stopped. Accordingly the piston 85 is moved rightwards as viewed in FIG. 4 due to the pressure difference between those in the cylinder chambers 87 and 88. This causes in turn the select lever 90, the shift head 62A and the shift shaft 62 to move to accomplish the shifting to the 2nd shift range. At this time the end 91 of the piston 85 is separated from the switch 95 and the end 89 of the piston is brought into contact with the switch 96 so that the completion of the shifting to 2nd shift range is informed to the electronic control unit 12. The afore-mentioned operation of the clutch engagement then begins.

Since shift operations to accomplish the other shift range are substantially similar with the afore-mentioned operations, the other operations of the shift shown in Table 1 will be briefly described.

Shifting from 2nd to 3rd range:

The solenoid valve 53 is opened from the 2nd range state and the spool of the valve 33 is returned upwards. The pressurized oil C passes the line 30b, 31a and 32b to provide a 3rd range working pressure and enters the cylinder chamber 88 of the cylinder 83 to move the shift shaft 63 to provide a 3rd range. At this time the cylinders 87 and 88 of the cylinder 82 is directly connected with the drain, and the piston 85 of the cylinder 82 is returned to the neutral position by the spring 92 of the cylinder 82 as shown in FIG. 4 to release the 2nd range.

Shifting from 3rd to 4th range:

The solenoid valve 51 is closed from the above-mentioned 3rd speed condition and the spool of the valve 30 is biased downwards. The pressurized oil C passes the lines 30a, 31c and 33c to provide a 4th range working pressure and enters the cylinder chamber 87 of the cylinder 83. Since the cylinder chamber 88 of the cylinder 83 is directly connected with the drain the piston 85 of the cylinder 83 and the shift shaft 63 are moved in a rightward direction as viewed in FIG. 4. The 3rd speed range is released to shift to a 4th shift range.

Shifting from 4th to 5th range:

The solenoid valve 52 is opened from the 4th range state (closed) and the spool of the valve 31 is returned upwards. The pressurized oil C passes the lines 30a, 31d and 32c to provide a 5th range working pressure and enters the cylinder chamber 88 of the cylinder 84. The piston 85 of the cylinder 84 is moved in a leftward direction as viewed in FIG. 5. The shift shaft 64 is moved to shift to 5th range. Since the cylinder chamber 87 of the cylinder 83 is directly communicated with the drain the piston of the cylinder 84 is moved to the neutral position as shown in FIG. 4 to release the 4th range.

Shifting to R range:

The R (reverse) range is accomplished when all the solenoid valves 51, 52 and 53 are closed to move all the spools of the valves 30, 31, 32 and 33 downwards. The pressurized oil C passes the lines 30a, 31c and 33b as a reverse range working pressure and enters the cylinder chamber 87 of the cylinder 84 to move the piston 85 of the cylinder 84 in a rightward direction as viewed in FIG. 4. A pair of the shift shaft 64 for shifting to the 5th range and a shift shaft 64' for shifting to the reverse range R are engaged with the shift head 64A which is operatively connected with the piston 85 of the cylinder 84. Shifting to the R range is carried out by means of the shift shaft 64'.

Accordingly, the shift operation can be carried out by one motion of the select lever in one axial direction of the shift shaft.

Although the shift operation of the transmission with forward 5 ranges has been described. The present invention is applicable to a forward 4 range transmission. In the latter case, the control in which only solenoid valve 51 is closed (i.e., 5th range) is deleted. Similarly a forward 3 range transmission may be provided.

The shifting for acceleration has been hereinabove described. The shifting for deceleration is carried out as follows:

Shifting from 5th to 4th shift range:

The solenoid valve 52 is energized (closed) while the solenoid valve 51 remains energized (closed) and the solenoid valve 53 remains deenergized.

Shifting from 4th to 3rd shift range:

The solenoid valve 51 is deenergized while the solenoid valve 52 remains energized and the solenoid valve 53 remains deenergized.

Shifting from 3rd to 2nd shift range:

The solenoid valve 53 is rendered energized while the solenoid valve 52 remains energized and the solenoid valve 51 remains deenergized.

Shifting from 2nd to 1st shift range:

The solenoid valve 52 is deenergized while the solenoid valve 53 remains energized.

Shifting to R range:

The solenoid valve 53 is deenergized while the other solenoid valves 51 and 52 are unchanged (deenergized).

TABLE 1

| | | speed ranges | | | | | |
|---|---|---|---|---|---|---|---|
| | R | N | 1st | 2nd | 3rd | 4th | 5th |
| solenoid valve | | | | | | | |
| 51 | O | X | X | X | X | O | O |
| 52 | O | X | X | O | O | O | X |
| 53 | O | X | O | O | X | X | X |

O: closed (energized)
X: open (deenergized)

| cylinder | chamber | | | | | | | |
|---|---|---|---|---|---|---|---|---|
| 82 | 87 | X | X | X | O | X | X | X |
| | 88 | X | X | O | X | X | X | X |
| 83 | 87 | X | X | X | X | X | O | X |
| | 88 | X | X | X | X | O | X | X |
| 84 | 87 | O | X | X | X | X | X | X |
| | 88 | X | X | X | X | X | X | O |

X: no pressure
O: pressure applied

What is claimed is:

1. A shifting apparatus for a motor vehicle transmission which comprises:
a shift actuator including a plurality of shift shafts, and a plurality of cylinders, springs and select levers;
said shift shafts effecting engagement and disengagement of transmission gears to accomplish a plurality of shift ranges;
each of said cylinders comprising one piston and two chambers defined by said piston, the piston being movable to three positions corresponding to the positions of the shift shaft and being actuated to one of the first or second position by applying working pressure to the chambers corresponding to each position;
each of said springs urging the pistons to locate at a neutral position defined between said first or second positions;
each of said select levers operatively connecting one of the shift shafts with a respective one of the pistons;
an electronic control unit for gear shift operation;
a hydraulic control unit comprising first, second and third solenoid valves, only the first solenoid valve being actuated at a first shift range, the first and second solenoid valves being actuated at a second shift range, only the second solenoid valve being actuated at a third shift range, and second and third solenoid valves being actuated at a fourth shift range, only the third solenoid valve being actuated at a fifth shift range, no solenoid valve being actuated at a neutral shift range, and
a reverse shift range being accomplished by actuating all the three solenoid valves.

2. A shifting apparatus for a motor vehicle transmission as defined in claim 1, in which said spring is disposed coaxial with the piston between a pair of retainers fitted slidably with the piston, said spring using said pair of retainers so as to separate from each other by pressing one retainer of the pair against the cylinder body while pressing the other against the housing of the shift actuator.

3. A shifting apparatus for a motor vehicle transmission as defined in claim 2, in which said one retainer is capable of separating from the cylinder body according to the movement of the piston in one axial direction by being engaged by the piston while said other retainer is capable of separating from the housing according to the movement of the piston in the opposite direction by being engaged by the piston.

4. The shifting apparatus for a motor vehicle transmission as defined in claim 1, in which the cylinders are disposed above the location of the shift shafts.

5. The shifting apparatus for a motor vehicle transmission as defined in claim 1, which further includes switches for detecting the position of the pistons.

6. The shifting apparatus for a motor vehicle transmission as defined in claim 1, in which the hydraulic control unit includes a plurality of valve means responsive to the output signals from said solenoid valves, said valve means having output ports connected with the respective cylinders to provide working pressure therefor.

7. The shifting apparatus for a motor vehicle transmission as defined in claim 6, in which each of said valve means comprises a spool which moves between different two positions in response to the output signals from the solenoid valves.

8. The shifting apparatus for a motor vehicle transmission as defined in claim 1, in which each of said shift shafts assumes a first position, a second position and a neutral position between the first and second positions.

9. The shifting apparatus for a motor vehicle transmission as defined in claim 8, in which each cylinder comprises a piston operatively connected with any of said shift shafts, the piston assuming respective positions corresponding to the positions of the shift shafts and being actuated to the first or second position by applying working pressure to a respective chamber assigned to each position.

10. The shifting apparatus for a motor vehicle transmission as defined in claim 9, in which the transmission includes at least four shift ranges each accomplished by applying working pressure to respective one of said chambers of the cylinders.

11. The shifting apparatus for a motor vehicle transmission as defined in claim 10, in which the transmission further includes a reverse shift range accomplished by applying working pressure to another one of said chambers of the cylinders.

12. The shifting apparatus for a motor vehicle transmission as defined in claim 10, in which the transmission includes at least three cylinders.

13. The shifting apparatus for a motor vehicle transmission as defined in claim 12, in which at least four forward shift ranges are accomplished.

14. The shifting apparatus for a motor vehicle transmission as defined in claim 13, in which a 5th forward shift range is accomplished by applying working pressure to further one of said chambers of the cylinders.

15. The shifting apparatus for a motor vehicle transmission as defined in claim 1, in which the electronic control unit provides at least signals for accomplishing gear shift operation and clutch engagement and disengagement.

16. The shifting apparatus for a motor vehicle transmission as defined in claim 15, in which the electronic control unit receives at least signals representative of engine revolution speed, brake operation, accelerator pedal position, shift lever position, clutch position and vehicle speed, and further provides a signal for controlling throttle valve opening.

17. The shifting apparatus for a motor vehicle transmission as defined in claim 15, which further has a pressure regulating valve means controlled by the electronic control unit for regulating working pressure for the clutch engagement and disengagement.

18. The shifting apparatus for a motor vehicle transmission as defined in claim 17, in which the pressure regulating valve means is a duty-control valve.

19. The shifting apparatus for a motor vehicle transmission as defined in claim 18, in which the pressure regulating valve means provides duty-controlled drainage to accomplish controlled engagement and disengagement of the clutch responsive to said input signals to the electronic control unit.

* * * * *